(12) United States Patent
Jessen et al.

(10) Patent No.: US 8,909,077 B2
(45) Date of Patent: Dec. 9, 2014

(54) MECHANISM FOR MONITORING PRINT SYSTEM ENERGY USAGE

(75) Inventors: Robert Jessen, Berthoud, CO (US); Dennis Carney, Louisville, CO (US)

(73) Assignee: Ricoh Productions Print Solutions LLC, Boulder, CO (US)

( * ) Notice: Subject to any disclaimer, the term of this patent is extended or adjusted under 35 U.S.C. 154(b) by 703 days.

(21) Appl. No.: 13/172,965

(22) Filed: Jun. 30, 2011

(65) Prior Publication Data
US 2013/0002237 A1   Jan. 3, 2013

(51) Int. Cl.
*G03G 15/00* (2006.01)

(52) U.S. Cl.
USPC .......................................................... 399/37

(58) Field of Classification Search
CPC .............. G03G 15/5004; G03G 15/80; G03G 2215/00978; Y02B 60/1278; Y02B 60/1267; Y02B 60/165
USPC ................................ 399/37, 88; 713/320, 340
See application file for complete search history.

(56) References Cited

U.S. PATENT DOCUMENTS

| | | | |
|---|---|---|---|
| 6,389,544 B1 | 5/2002 | Katagiri | |
| 6,393,233 B1 | 5/2002 | Soulier | |
| 6,976,182 B1 * | 12/2005 | Filippo | 713/324 |
| 7,016,624 B2 | 3/2006 | Namura | |
| 7,103,787 B2 | 9/2006 | Cantwell | |
| 7,134,029 B2 * | 11/2006 | Hepner et al. | 713/300 |
| 7,383,451 B2 * | 6/2008 | Matsushima et al. | 713/300 |
| 7,517,162 B2 | 4/2009 | Aizawa | |
| 7,523,332 B2 | 4/2009 | Schumacher | |
| 7,586,637 B2 | 9/2009 | Eastment | |
| 7,590,361 B2 | 9/2009 | Chizawa | |
| 7,729,633 B2 | 6/2010 | Bildstein | |
| 7,895,459 B2 * | 2/2011 | Goodnow et al. | 713/340 |
| 8,082,454 B2 * | 12/2011 | Totten | 713/300 |
| 2009/0070604 A1 | 3/2009 | Kumakura | |
| 2010/0174935 A1 | 7/2010 | Kim | |
| 2010/0220346 A1 | 9/2010 | Hakamada | |

FOREIGN PATENT DOCUMENTS

JP    2004085985 A  *  3/2004

OTHER PUBLICATIONS

Montero, E., "Sustainable Printing Activities: Design and Initial Approach of a Print Energy Life-cycle Decision", Retrieved from: Toolhttp://print.rit.edu/events/symp09/drafts/MHER_PIC_Draft0910.pdf, (Oct. 2009), 1-26.

* cited by examiner

*Primary Examiner* — Robert Beatty
(74) *Attorney, Agent, or Firm* — Blakely, Sokoloff, Taylor & Zafman LLP (57) ABSTRACT

A printer is disclosed. The printer includes one or more sub-components each having a meter to track energy usage at the sub-component during an event and a controller to receive energy usage data accrued at one or more of the meters during the event.

18 Claims, 6 Drawing Sheets

| CUSTOMER ID | PRINT JOB ID | EVENT TYPE | EVENT ENERGY CONSUMPTION | PRINTING SYSTEM ELEMENT | EVENT TIME/DATE | EVENT STATUS | PRINT SYSTEM ID |
|---|---|---|---|---|---|---|---|
| 1234 | 4567 | PRINTING JOB | 94373 | FUSER 1224 | 201009190731 | COMPLETED | 1 |
| 1234 | 4567 | PRINTING JOB | 39203 | FINISHER 3913 | 201009190745 | COMPLETED | 1 |
| 5929 | 3493 | PRINTING JOB | 14526 | FUSER 1224 | 201009190833 | COMPLETED | 1 |
| NONE | NONE | IDLE | 3982 | PRINT CONTROLLER | 201009190934 | COMPLETED | 1 |

Figure 5A

| CUSTOMER ID | PRINT JOB ID | EVENT TYPE | EVENT ENERGY CONSUMPTION | PRINTING SYSTEM ELEMENT | EVENT TIME/DATE | EVENT STATUS | PRINTING SYSTEM ID | PROJECT ID |
|---|---|---|---|---|---|---|---|---|
| 1234 | 4567 | PRINTING JOB | 94373 | FUSER 1224 | 201009190731 | COMPLETED | 1 | AUG 2010 STATEMENTS |
| 1234 | 4567 | PRINTING JOB | 39203 | FINISHER 3913 | 201009190745 | COMPLETED | 1 | AUG 2010 STATEMENTS |
| 5929 | 3493 | PRINTING JOB | 14526 | FUSER 1224 | 201009190833 | COMPLETED | 1 | ACQUISITION REPORTS A |
| NONE | NONE | IDLE | 3982 | PRINT CONTROLLER | 201009190934 | COMPLETED | 1 | SEP 2010 OVERHEAD |
| 1234 | 3692 | PRINTING JOB | 2030 | ALL SYSTEM | 201009207328 | COMPLETED | 2 | AUG 2010 STATEMENTS |

Figure 5B

| CUSTOMER ID | PROJECT ID (CLICK TO VIEW DETAILS) | PROJECT STATUS | QUANTITY OF ENERGY UNITS | ENERGY COSTS |
|---|---|---|---|---|
| 1234 | AUG 2010 STATEMENTS | COMPLETE | 120,300 | 320 |
| 5929 | ACQUISITION REPORTS A | INCOMPLETE | 230,303 | 698 |
| NONE | SEP 2010 OVERHEAD | COMPLETE | 45,302 | 173 |

MECHANISM FOR MONITORING PRINT SYSTEM ENERGY USAGE

FIELD OF THE INVENTION

The invention relates to the field of printing systems, and in particular, to management of printing systems.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer. Once a connection is established between a workstation and the printer, printing software is implemented at a print server to manage a print job from order entry and management through the complete printing process. The printing software may simultaneously manage in excess of thousands of print jobs that have been spooled (or queued) for production. One type of printer management is the accounting and management of printer resource consumption.

In some cases the program, such as a billing application, can generate very large files that are printed on large, high speed digital printers. In the case of transaction oriented applications, such as billing, the print output must go through an additional post-printing process to separate the file into individual documents that are then placed in envelopes and mailed to the relevant individuals. Thus, printing software may simultaneously manage in excess of thousands of print jobs that have been spooled (or queued) for production.

The printing software may also provide additional management functions, such as accounting and management of printer resource consumption. Specifically, printing entities (e.g., businesses and individuals) strive to minimize overall electrical energy consumption (i.e., usage) as an expense control, while billing customers for usage while generating the customer's print jobs. Therefore, in order for the operator of a high speed inkjet printing system to be adequately compensated for producing print jobs it is necessary to monitor resource consumption associated with a particular print job.

Currently, print engines within printing systems have the ability to report constant counter-based values on a print job basis to the printing software. These values include information such as job start/stop time, number of errors encountered, stops/starts, ink usage, and page count. Each of these items is an additive value, where a counter is kept and reported.

However some systems within a printing system are variable in that they may be on or off for different durations during the printing of a specific job. For instance, an ink dryer is a large consumer of energy within inkjet printing systems. The operation of an ink dryer may vary widely between different print jobs, making it difficult to track dryer energy consumption attributable to individual print jobs. Thus, achieving an accurate reporting for energy consumption attributable to variable systems is difficult.

Accordingly, a mechanism for monitoring energy usage associated with producing a print job is desired.

SUMMARY

In one embodiment, a printer is disclosed. The printer includes one or more sub-components each having a meter to track energy usage at the sub-component during an event and a controller to receive energy usage data accrued at one or more of the meters during the event.

In another embodiment, a method is disclosed. The method includes receiving a first print job at a printer having one or more sub-components each including a meter to track energy usage and receiving energy usage data accrued at one or more of the meters during the print job.

BRIEF DESCRIPTION OF THE DRAWINGS

A better understanding of the present invention can be obtained from the following detailed description in conjunction with the following drawings, in which.

DETAILED DESCRIPTION

A mechanism for monitoring energy usage associated with producing a print job is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
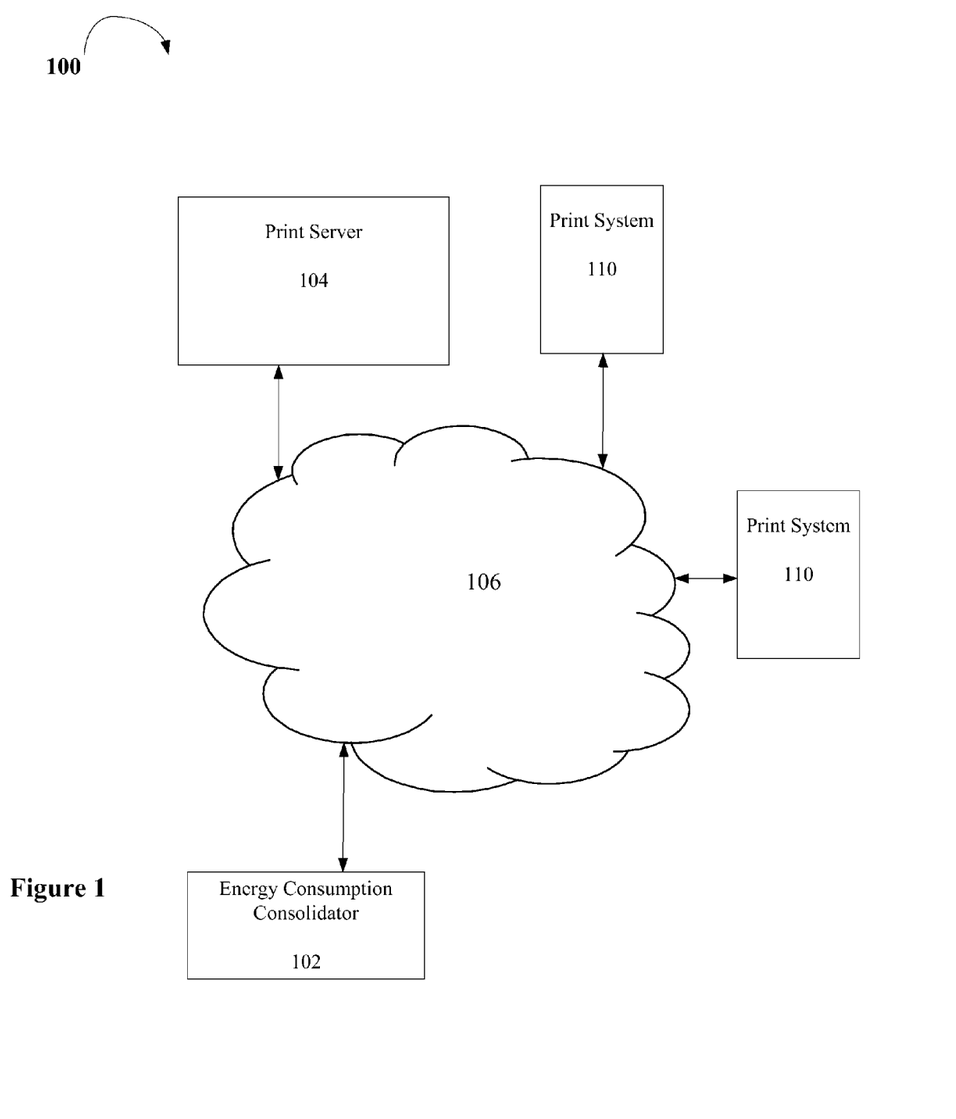
FIG. 1 illustrates one embodiment of a data processing system network.

FIG. 1 illustrates one embodiment of a printer network 100. Printer network 100 includes an energy consumption consolidator server 102, print server 104, and print systems 110, all coupled to network 106. Energy consumption server 102 gathers data from the plurality of printers 110 and consolidates the energy consumed at each print system 110.

Print server 104 includes a printing software product that manages the printing of documents at print systems 110. Particularly, the printing software product schedules print jobs at print systems 110. In a further embodiment, the printing software product generates billing information used to invoice customers for whom print jobs were generated. In one embodiment, the printing software product may be implemented using either InfoPrint Manager (IPM) or InfoPrint ProcessDirector (IPPD), although other types of printing software may be used instead.

Figure 2:
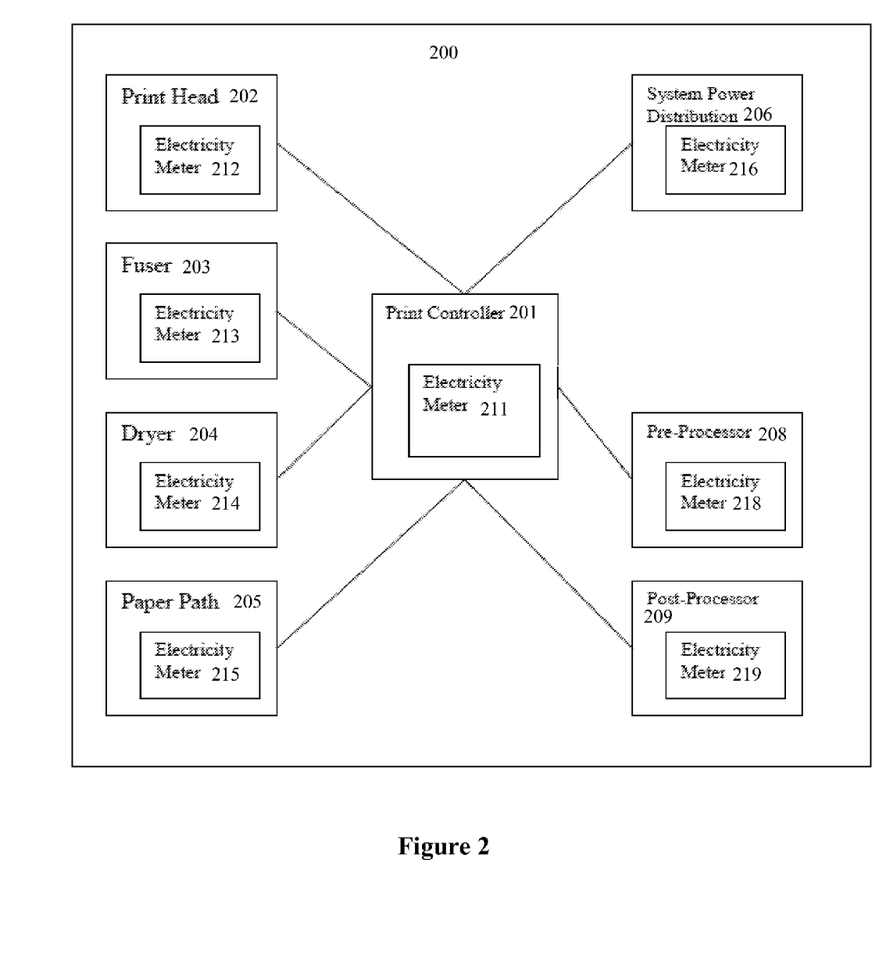
FIG. 2 illustrates one embodiment of a print system.

FIG. 2 is a block diagram illustrating one embodiment of a print system 200 representative of printing systems 110 shown in FIG. 1. Print system 200 is a system used to provide marks on a media, such as a continuous forms printer or a cut sheet page printer. Print system 200 may include any digital hardcopy output device, such as printers, copiers, multifunction printers (MFP's) and facsimiles.

Print system 200 includes a print controller 201 and print heads 202. According to one embodiment, print controller 201 may process and render objects received from print server 104 and provide sheet maps for printing to print heads 202. Print system 200 includes additional sub-components, such as a fuser 203, ink dryer 204, paper path 205, system power distribution 206, pre-processor 208 and post processor 209.

According to one embodiment, each sub-component within printer 200 includes one or more electricity meters to enable the monitoring of electrical energy usage. For instance, printer controller 201 includes a meter 211, print head 202 includes a meter 212, fuser 203 includes meter 213, etc. In one embodiment, the electricity meters are solid state integrated circuit devices that measure energy consumption. However, other energy consumption measurement devices (e.g., Watt meters) may be implemented.

According to one embodiment, each electricity meter is communicatively coupled to print controller 201 in order to provide electricity energy usage data to printer controller 201. In a further embodiment, print controller 201 communicates bi-directionally with the electricity meters. For example, in addition to collecting data from the electricity meters, print controller 201 can issue commands (e.g., start, stop, reset, etc.) or load new data (e.g. new microcode, configuration, etc) to the electricity meters per automated, user or administrator initiated actions.

In one embodiment, the communicative coupling may be wired, radio frequency or optical connection. Once an event occurs, print controller 201 collects data from the targeted electricity meters. In one embodiment, an event includes individual print jobs that are processed by the printing system. However in other embodiments, an event may include idle periods, cleaning, maintenance and diagnostics.

During an event, print controller 201 collects energy consumption data for the time period of interest from all the targeted electricity meters. The collected data represents the energy consumption of the print system elements for that time interval. In a further embodiment, printer controller 201 associates the data from the electricity meters with the corresponding print system component (e.g. print head 202, fuser 203, etc) identification (type, name, serial number, etc). Thus, the energy consumption of select components of the print system 200 may be distinguished for an event.

Figure 3:
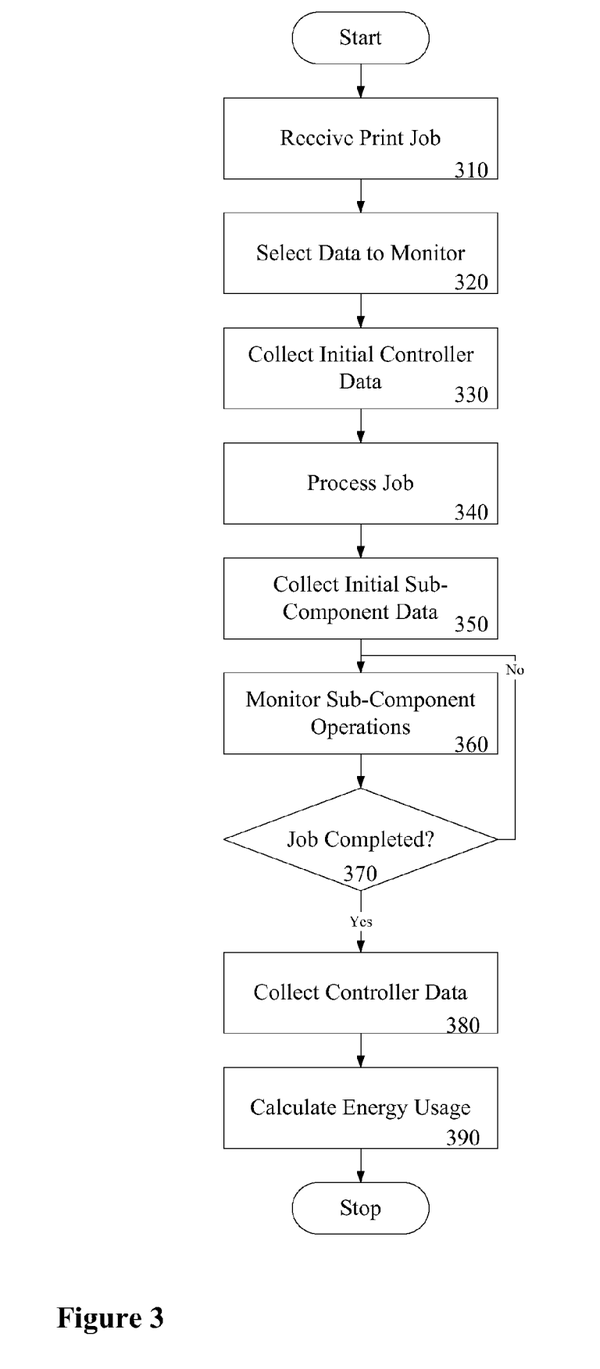
FIG. 3 is a flow diagram illustrating one embodiment for tracking energy consumption within a printer.

FIG. 3 is a flow diagram illustrating one embodiment for monitoring energy consumption at a print system 200. At processing block 310, a print job is received. At processing block 320, a selection is made as to the data that is to be monitored. In one embodiment, the selection includes the electricity meters that are to be monitored. For instance, no monitoring of meters may be required for print jobs in which a customer has a flat fee arrangement.

At processing block 330, initial data is collected from controller 201. In one embodiment, controller 201 queries its internal electricity meter to obtain the meter start value. At processing block 340, processing of the print job commences. At processing block 350, initial data is collected from the print system 200 sub-components. In one embodiment, printer controller 201 queries each electricity meter within a sub-component (e.g., fuser, dryer, print head, and so on) to obtain meter start values.

Figure 4:
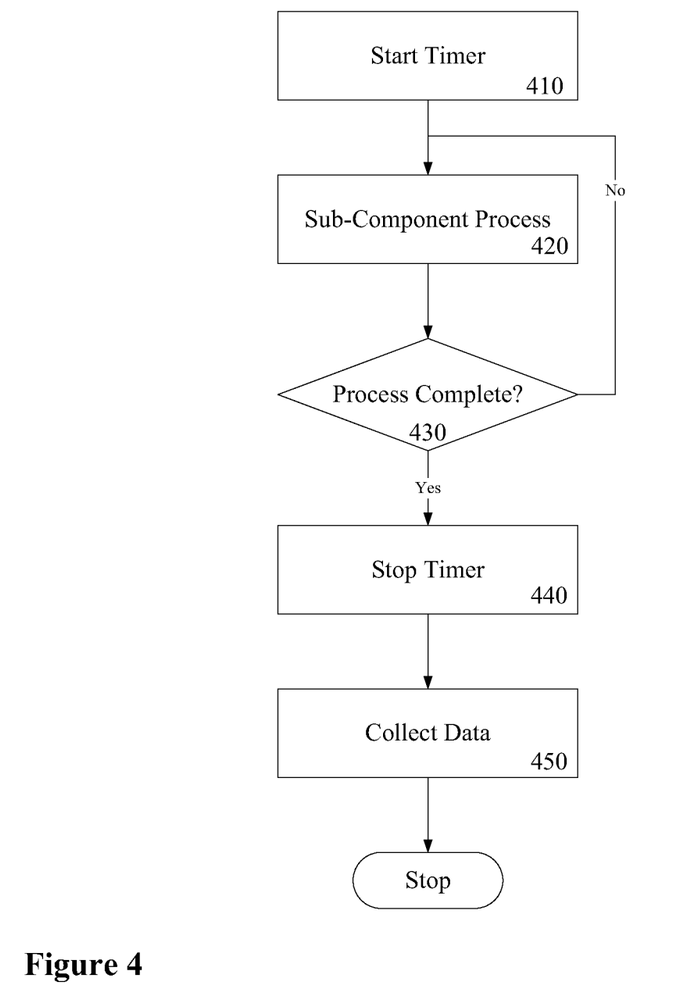
FIG. 4 is a flow diagram illustrating one embodiment for tracking energy consumption within a printer subcomponent.

At processing block 360, print controller 201 monitors the operation of each sub-component. In one embodiment, print controller 201 monitors the status of each sub-component in order to track energy consumption within each. FIG. 4 is a flow diagram illustrating one embodiment for tracking energy consumption within a printer sub-component.

At processing block 410, a timer is started for the particular sub-component. For example, the timer may begin when the first sheet of a print medium enters dryer 204. At processing block 420, the sub-component process (e.g., dryer 204) is performed. At decision block 430, it is determined whether the sub-component process has completed. If the process has not completed, control is returned to processing block 420 where the sub-component process continues.

If the sub-component process has been completed the timer is stopped, processing block 440. For example, the timer is stopped when the final sheet passes through dryer 204. At processing block 450, print controller 201 collects the energy usage data from the sub-component by querying the electricity meter for an end value. As discussed above, this process may be performed for each sub-component within print system 200. However in other embodiments, the process may be performed for other components implemented to produce a print job. For example, if pages of the print job are forwarded to a blade system to be rasterized, print controller 201 may query an electricity meter in the blade system (e.g., to obtain start and end value described above) for energy usage associated with rasterization of the job.

Referring back to FIG. 3, it is determined, during the operation of each sub-component, whether the print job has been completed, decision block 370. If the print job has not completed, control is returned to processing block 360 where monitoring the sub-component processes continues. If the print job has been completed print controller 201 collects the energy usage data from its internal electricity meter by querying the electricity meter for an end value, processing block 380. Print controller 201 subsequently stores all start and end values for the job and uses those values to calculate total energy usage for the job, processing block 390. The above-described process also accurately records energy usage for multiple print jobs that are simultaneously being processed at print system 200.

In another embodiment, passive energy monitoring may be performed in lieu of the above-described process (e.g., active energy monitoring). In such an embodiment print controller 201 periodically queries all electricity meters (more often when jobs are active) and stores the energy data. Additionally, print controller 201 maintains a list of events in print system 200 that should be correlated with energy usage (e.g., receive job, start processing job, start printing job, end printing job, job stacked, printer jam, diagnostics). Subsequently, an analysis is performed using the combination of the two data sources. Energy usage can then be charged to jobs retroactively.

Such a passive approach has the advantage that the reading of the energy sensors is not part of the main control flow of the processing of a job—jobs process completely independently of energy monitoring. In this sense, the data (occurrence time and data attribute values of events) is logged and further processed after the series of events (e.g., after one or more print jobs complete) occur.

According to one embodiment, print controller 201 matches the data from the electricity meters with other selected event data attributes of interest in which controller 201 has access. For example, event data attributes include printer system ID (i.e. identification number or name), print element ID, print job ID, time, day, printing system (or element) status (e.g. printing job, diagnostics, idle, high speed, low speed, etc.), print job status, printing system configuration settings, event processing duration and others. The data collected can be limited to the data attributes of interest.

According to one embodiment, event data attributes may provide information that can be used for later assignment of concurrent energy usage in sub-components. For example, data attributes may indicate that a print controller rasterization event was for more than one concurrent named print job. This information allows later assignment of the energy usage to the individual named print jobs.

According to one embodiment, estimated energy data for sub-components that do not have electricity meters can be collected along with electricity meter data for sub-components that do have electricity meters. For example, if a dryer sub-component does not have an electricity meter, energy usage for the dryer sub-component could instead be estimated using known methods (such as nominal power usage ratings and duty cycle). This enables the calculation of energy usage in hybrid systems where electricity meters are only on some sub components.

Figure 5A:
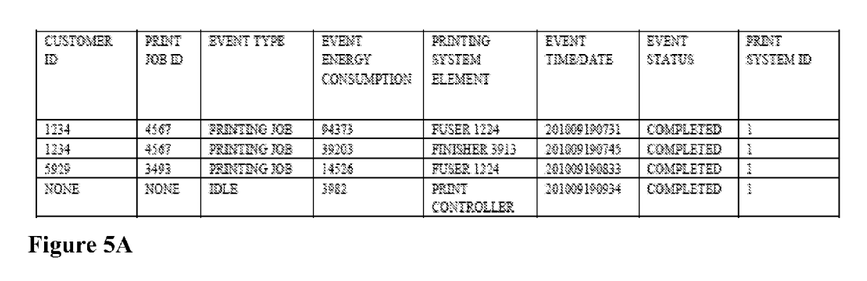
FIGS. 5A-5C illustrate embodiments of energy data collection.
Figure 5B:
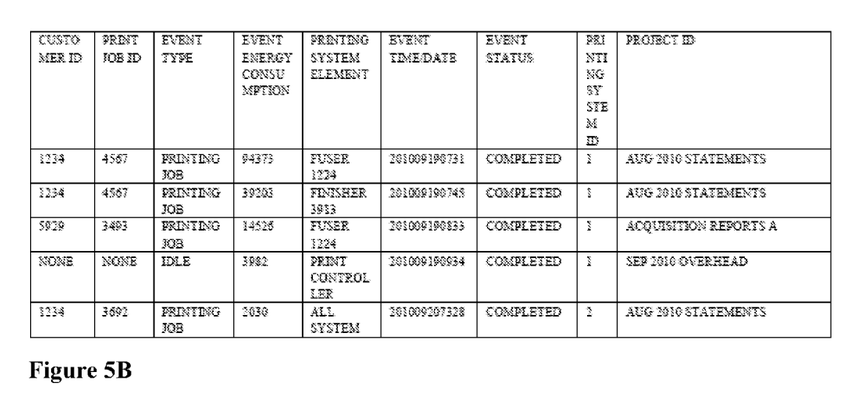
Figure 5C:
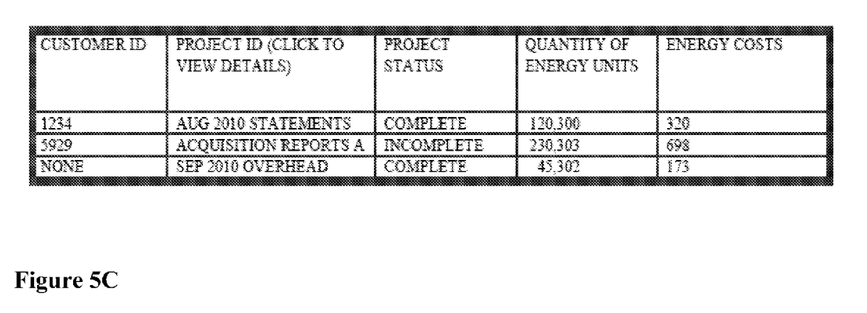

FIGS. 5A-5C illustrate embodiments of energy data collection. FIG. 5A illustrates one embodiment of the data collected by print controller 201. In one embodiment, energy usage data is made available outside of print system 200. For instance, energy consumption consolidator 102 gathers data from a plurality of print systems 110 and stand alone devices (e.g., some post processor equipment line inserters are physically separate from the printing systems) and consolidates the printing system energy consumption data appropriately. FIG. 5B illustrates one embodiment of the data collected by energy consumption consolidator 102 from multiple print systems 110. FIG. 5C illustrates one embodiment of the data summarized and formatted for display or reports by the energy consumption consolidator 102.

In one embodiment, energy usage data may also be retrieved by a host (or other device) using various existing means like protocols (e.g. SNMP, TCP/IP, FTP, HTTP, email, etc), or conduits (e.g. WAN, LAN, PC Serial, PC Parallel, IEEE1394, USB, 802.11x, etc.), in various formats (e.g. MIB, XML, CSV, etc). In a further embodiment, the information may also be printed by printing systems 110, displayed on a display at a printing system 200 or available at a web page.

The above described mechanism may also be implemented in other systems or system elements not directly related to printing. For example, the mechanism may be used in standalone print pre-processing (e.g. unwinders), print post-processing (e.g. cutters, folders, winders, binders), inserters, computers, computer peripherals, servers, networking, telecommunications, lighting, heating, air conditioning, lighting, consumer, office, or industrial equipment. In those cases print controller 201 is replaced with other device controllers.

Figure 6:
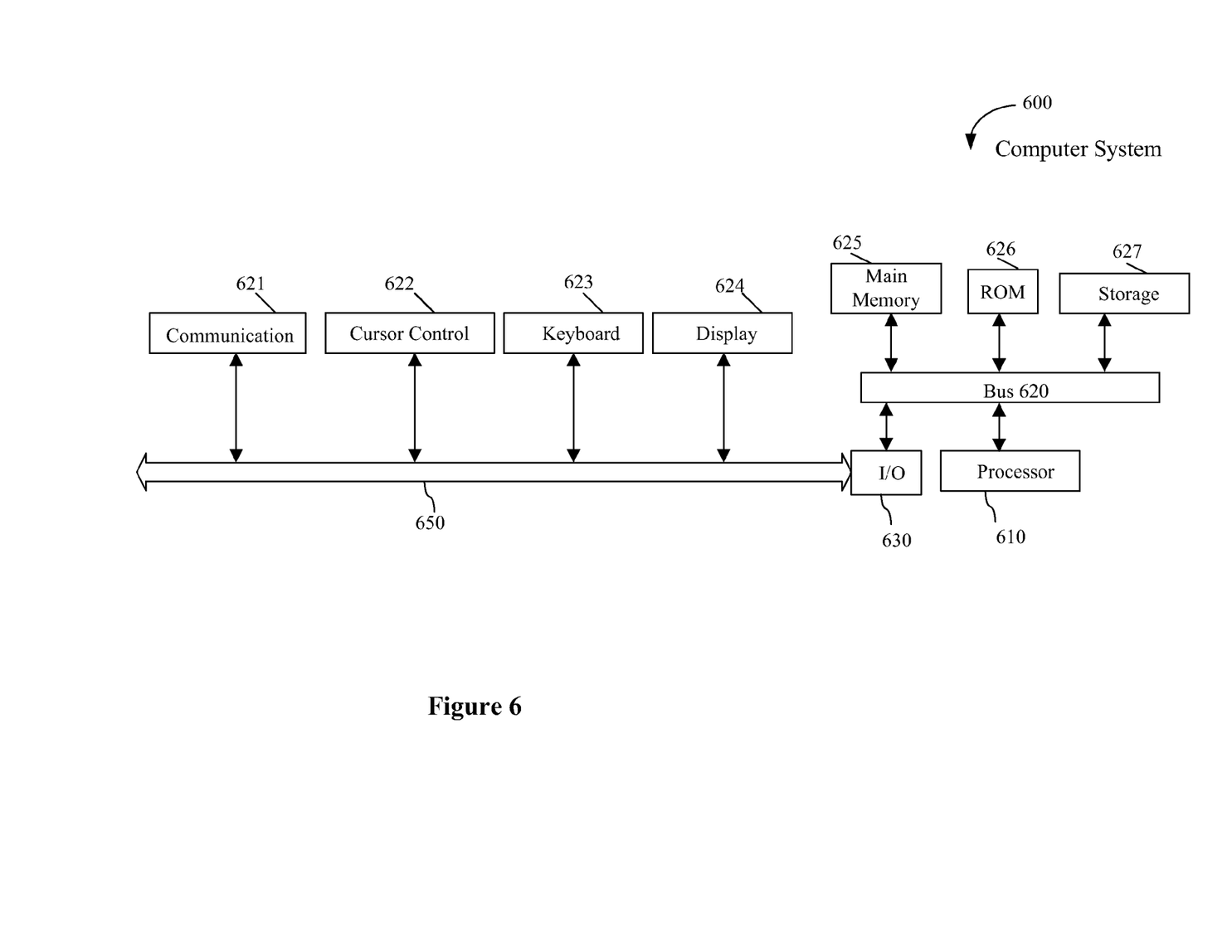
FIG. 6 illustrates one embodiment of a computer system.

FIG. 6 illustrates a computer system 600 on which printing system 200 may be implemented. Computer system 600 includes a system bus 620 for communicating information, and a processor 610 coupled to bus 620 for processing information.

Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and or other static storage device 626 coupled to bus 620 for storing static information and instructions used by processor 610.

A data storage device 627 such as a magnetic disk or optical disc and its corresponding drive may also be coupled to computer system 600 for storing information and instructions. Computer system 600 can also be coupled to a second I/O bus 650 via an I/O interface 630. A plurality of I/O devices may be coupled to I/O bus 650, including a display device 624, an input device (e.g., an alphanumeric input device 623 and or a cursor control device 622). The communication device 621 is for accessing other computers (servers or clients). The communication device 621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printer comprising:
   one or more sub-components including:
      a first sub-component having a first meter to track energy usage at the first sub-component during an event; and
      a second sub-component having a second meter to track energy usage at the second sub-component during the event occurring; and
   a controller to receive energy usage data accrued at the first and second meters during the event and to match energy usage data from the first and second sub-components with event data attributes for assignment of energy usage to the first and second sub-components.

2. The printer of claim 1 wherein the controller distinguishes between energy usage data accrued at the first sub-component and the second sub-component during the event.

3. The printer of claim 2 wherein the controller comprises a meter to track energy usage at the controller during the event.

4. The printer of claim 3 wherein the controller calculates total energy usage during the event by combining the energy usage data accrued at the controller, the first sub-component and the second sub-component during the event.

5. The printer of claim 1 wherein the event is a print job.

6. The printer of claim 1 further comprising a third sub-component, wherein the third sub-component does not include an electricity meter and wherein the controller tracks energy usage of the third sub-component.

7. A method comprising:
- receiving a first print job at a printer having one or more sub-components each including a meter to track energy usage;
- tracking energy usage at a first sub-component via a first meter at the first sub-component during an event;
- tracking energy usage at a second sub-component via a second meter at the second sub-component during the event;
- receiving energy usage data accrued at the first and second meters during the print job; and
- matching energy usage data from the first and second sub-components with event data attributes for assignment of energy usage to the first and second sub-components.

8. The method of claim 7 wherein receiving energy usage data accrued at the one or more of the meters comprises:
- collecting data from each of the meters prior to operation of each of the sub-components; and
- collecting data from each of the meters upon completion of operation of each of the sub-components.

9. The method of claim 8 wherein collecting data from a meter prior to operation of sub-component comprises querying the meter for a start value and collecting data from the meter upon completion of operation of the sub-component comprises querying the meter for a stop value.

10. The method of claim 8 further comprising monitoring each sub-component during operation.

11. The method of claim 7 further comprising calculating total energy usage during the print job by combining the energy usage data accrued for each of the sub-components.

12. The method of claim 11 further comprising transmitting total energy usage during the print job to an energy consumption consolidator.

13. A printing network comprising:
- a printer, communicatively, including
  - one or more sub-components including:
    - a first sub-component having a first meter to track energy usage at the first sub-component during an event; and
    - a second sub-component having a second meter to track energy usage at the second sub-component during the event occurring;
  - a controller to receive energy usage data accrued at the first and second meters during the event and to match energy usage data from the first and second sub-components with event data attributes for assignment of energy usage to the first and second sub-components; and
- an energy consumption consolidator, communicatively coupled to the printer, to consolidate energy usage data accrued for two or more events occurring at the printer.

14. The printing network of claim 13 wherein the controller distinguishes between energy usage data accrued at the first sub-component and the second sub-component during the event.

15. The printing network of claim 14 wherein the controller comprises a meter to track energy usage at the controller during the event.

16. The printing network of claim 15 wherein the controller calculates total energy usage during the event by combining the energy usage data accrued at the controller, the first sub-component and the second sub-component during the event.

17. The printing network of claim 13 further comprising a second printer, communicatively coupled to the energy consumption consolidator, including:
- one or more sub-components each having a meter to track energy usage at the sub-component during an event; and
- a controller to receive energy usage data accrued at one or more of the meters during the event.

18. The printing network of claim 17 wherein the energy consumption consolidator consolidates energy usage data accrued for two or more events occurring at the first and second printer.

* * * * *

UNITED STATES PATENT AND TRADEMARK OFFICE
CERTIFICATE OF CORRECTION

PATENT NO. : 8,909,077 B2
APPLICATION NO. : 13/172965
DATED : December 9, 2014
INVENTOR(S) : Jessen et al.

Page 1 of 1

It is certified that error appears in the above-identified patent and that said Letters Patent is hereby corrected as shown below:

In the Claims

In column 6, at line 47, Claim 1, after, -- event -- delete "occurring".

In column 8, at line 6, Claim 13, after, -- event -- delete "occurring".

Signed and Sealed this
Nineteenth Day of May, 2015

Michelle K. Lee
*Director of the United States Patent and Trademark Office*